UNITED STATES PATENT OFFICE.

JEAN IGNAZ LEIST, OF BROOKLYN, NEW YORK.

COMPOSITION FOR REPELLING RODENTS AND INSECTS.

1,270,630.  Specification of Letters Patent.  Patented June 25, 1918.

No Drawing.  Application filed October 15, 1913.  Serial No. 795,243.

*To all whom it may concern:*

Be it known that I, JEAN IGNAZ LEIST, a subject of the German Emperor, residing at Brooklyn, in the county of Kings, city and State of New York, have invented a new and useful Composition for Repelling Rodents and Insects.

The object of my invention is to provide a non-poisonous composition of matter, which may be economically produced and which may be readily used to rid dwellings, factory buildings, stores, etc., of rodents and insects, by driving them from the premises, the ingredients of my composition of matter being of a nature which will be repulsive to rodents and insects so that the premises where my new and useful composition is used may be effectively rid of these pests.

A further object of my invention is to produce a new and useful composition of matter for the aforesaid purposes which may be employed in the form of a cement or plaster, or may be used as a filling in the same manner that putty is employed, the nature of the composition being such that paint, calcimine or other similar coatings or coverings may be applied thereto, if desired.

I shall now proceed to set forth the constituents of my new and useful composition of matter and the manner in which it may be employed and the results attained thereby.

My composition consists of the following dry ingredients, which may be used in any quantity combined in the proportions stated, viz:

25 parts of hydrated lime,
25 " " plaster Paris,
10 " " marble dust,
8 " " asbestine material,
2 " " whiting or chalk,
2 " " clay,
2 " " magnesium carbonate,
8 " " casein,
2 " " cement,
10 " " powdered alum,
3 " " powdered borax,
3 " " thymol.

I have found by experiments with different materials that for the purposes of my invention a composition produced in accordance with the foregoing formula gives the most efficient results. The whiting or chalk combined with the clay form a durable base material, with which the plaster of Paris and cement readily commingle to produce a hard substance when mixed with marble dust, asbestine, and magnesium carbonate, in the proportion stated, the latter of which prevent cracking or breaking apart of the materials in the hardening or setting process. The casein is employed as a binder, its qualities being preserved by the use of borax, the hydrate of lime serving as a solvent for the binder; while, the powdered alum is employed to accelerate the setting of the constituents of my composition. Thymol as is well known possesses a strong and peculiar odor and is added to the other ingredients for the specific purposes hereinafter explained.

The ingredients set forth in my foregoing formula, when thoroughly mixed by any suitable method, will produce a white powder, to one pound of which I add one pint of cold water, the powder being worked or agitated in the water until a plastic material of the ordinary consistency of putty is produced. This plastic material may then be used to fill in crevices or holes in walls, floors or the like in buildings, or as a filler between the walls and wainscoting or base boards of rooms and, in fact, in any place where rodents or insects are likely to exist or use as a means for entrance into the premises. By reason of the plastic nature of my compound, it will be seen that it may be readily applied the same as cement, plaster or putty, its constituents being of a nature to render it adhesive and susceptible to hardening within twelve to twenty-four hours after its application or use.

I have found that this composition of matter proves very efficacious in keeping buildings, adapted to various purposes, free from rodents in particular, by reason of it containing alum and thymol, the peculiar odor of the latter being repulsive to rodents while the alum when moisture is applied thereto, through the saliva of the rodent coming in contact therewith, prevents their gnawing the material, the effect, therefore, being to drive them away from the premises and resulting in their complete elimination therefrom. The composition is non-poisonous and has a further advantage in that the constituents thereof are of a nature which will render its employment desirable as a disinfectant.

If desired, the dry compound made in accordance with the foregoing formula may be used in powdered form as a means of ridding rooms and the like of flies and other winged insects, for such purposes the compound being placed in a suitable receptacle in some portion of the room from which it is desired to eliminate the insects. My compound may also be used in its dry form and shaken or thrown into crevices, etc., similarly to other known powders which are used for exterminating croton bugs, roaches and the like, my compound differing from the other by reason of the fact that it does not kill the insects and leave them about the premises, but drives them therefrom.

While I have given above certain proportions, for the ingredients for my composition, and have also set forth certain substances to be employed in the production thereof, it is obvious that the proportions of the substances may be varied and that certain other substances may be substituted for those named in my foregoing formula; for instance, in lieu of casein I may employ glue or gum, either of which is soluble in cold water similarly to casein, while, pumice may be substituted for the marble dust, or talc for asbestine material, and so on, the fundamental idea of my new and useful composition of matter being to produce one which may be applied in the form of plastic material and which will possess the hardening characteristics of cement, plaster and the like and will embody certain substances which will serve to drive or eliminate rodents and insects from the premises where my composition of matter is used.

Having thus described my invention what I claim as new herein and desire to secure by Letters Patent is:

The herein described composition of matter consisting of 25 parts of hydrated lime, 25 parts of plaster of Paris, 10 parts of marble dust, 8 parts of asbestine material, 2 parts of whiting, 2 parts of clay, 2 parts of magnesium carbonate, 8 parts of casein, 2 parts of cement, 10 parts of powdered alum, 3 parts of powdered borax and 3 parts of thymol, and a sufficient quantity of cold water mixed therewith to form a plastic mass, which is adapted to harden upon exposure to the atmosphere.

In witness whereof I have hereunto set my hand in the presence of two subscribing witnesses this 25th day of September, 1913.

JEAN IGNAZ LEIST.

Witnesses:
 WM. C. DUNN,
 P. FRANK SONNEK.

Copies of this patent may be obtained for five cents each, by addressing the "Commissioner of Patents, Washington, D. C."